(12) United States Patent
Peng et al.

(10) Patent No.: US 10,417,286 B1
(45) Date of Patent: *Sep. 17, 2019

(54) CONTENT SELECTION

(71) Applicant: Google Inc., Mountain View, CA (US)

(72) Inventors: Yefei Peng, Mountain View, CA (US); Christopher Kenneth Harris, Santa Clara, CA (US)

(73) Assignee: Google LLC, Moutain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,980

(22) Filed: Sep. 14, 2017

Related U.S. Application Data

(63) Continuation of application No. 14/085,153, filed on Nov. 20, 2013, now Pat. No. 9,767,196.

(51) Int. Cl.
  *G06F 16/95* (2019.01)
(52) U.S. Cl.
  CPC .................. *G06F 16/95* (2019.01)
(58) Field of Classification Search
  CPC .......... G06Q 30/0244; G06Q 30/0273; G06Q 30/0275; G06Q 30/0277; G06F 17/3053; G06F 17/30424; G06F 17/30286; G06F 17/3089; G06F 17/30867; G06F 16/95
  See application file for complete search history.

(56) References Cited

U.S. PATENT DOCUMENTS

| | | | | |
|---|---|---|---|---|
| 7,283,997 B1 * | 10/2007 | Howard, Jr. | ...... | G06F 17/30702 |
| 7,818,208 B1 * | 10/2010 | Veach | .................... | G06Q 30/02 |
| | | | | 705/14.4 |
| 8,255,386 B1 | 8/2012 | Annau et al. | | |
| 8,600,809 B1 * | 12/2013 | Kubica | .................. | G06Q 30/02 |
| | | | | 705/14.41 |
| 2001/0027420 A1 * | 10/2001 | Boublik | ................. | G06Q 30/06 |
| | | | | 705/26.81 |
| 2003/0185541 A1 * | 10/2003 | Green | ..................... | H04N 5/76 |
| | | | | 386/250 |

(Continued)

OTHER PUBLICATIONS

"Walmart and Google to offer voice-enabled shopping", BBC News, Aug. 23, 2017 (10 pages).

(Continued)

*Primary Examiner* — Hasanul Mobin
(74) *Attorney, Agent, or Firm* — Foley & Lardner LLP; James De Vellis

(57) ABSTRACT

Systems and methods of the present disclosure are directed generally to facilitating content selection by identifying low impact criteria. In some implementations, a data processing system accesses a data structure storing, in a memory element, a plurality of impression records. Each impression record can include one or more features and an indication of user interest corresponding to a content impression. The data processing system can identify a combination feature based on at least two of the features. The data processing system can execute a statistical model (e.g., logistic regression model) using the impression records and the combination feature. The data processing system can determine a weight for the combination feature. Responsive to the weight being less than a threshold, the data processing system can transmit an indication to disable the combination feature for selecting content associated with the plurality of impression records.

20 Claims, 3 Drawing Sheets

(56) References Cited

U.S. PATENT DOCUMENTS

| | | | |
|---|---|---|---|
| 2006/0173744 A1 | 8/2006 | Kandasamy et al. | |
| 2007/0027865 A1 | 2/2007 | Bartz et al. | |
| 2008/0097843 A1* | 4/2008 | Menon | G06Q 30/02 705/14.1 |
| 2008/0102947 A1 | 5/2008 | Hays et al. | |
| 2008/0147488 A1* | 6/2008 | Tunick | G06Q 30/02 705/7.29 |
| 2008/0221983 A1 | 9/2008 | Ausiannik et al. | |
| 2009/0106070 A1* | 4/2009 | Konar | G06Q 30/02 705/14.41 |
| 2009/0265243 A1* | 10/2009 | Karassner | G06Q 30/02 705/14.54 |
| 2010/0100414 A1* | 4/2010 | Lin | G06Q 30/02 705/14.43 |
| 2011/0029376 A1 | 2/2011 | Mills et al. | |
| 2011/0106630 A1* | 5/2011 | Hegeman | G06Q 30/02 705/14.71 |
| 2011/0154230 A1 | 6/2011 | Basu et al. | |
| 2012/0016736 A1 | 1/2012 | Tolompoiko et al. | |
| 2013/0006758 A1* | 1/2013 | Hegeman | G06Q 30/0251 705/14.46 |
| 2013/0124300 A1* | 5/2013 | Hopwood | G06Q 30/0251 705/14.44 |
| 2013/0151346 A1* | 6/2013 | Schoen | G06Q 30/02 705/14.66 |
| 2013/0298159 A1* | 11/2013 | You | H04N 21/478 725/34 |
| 2014/0059071 A1 | 2/2014 | Frydman et al. | |
| 2014/0118403 A1* | 5/2014 | Verthein | H04N 7/15 345/660 |
| 2014/0172545 A1* | 6/2014 | Rabkin | G06Q 30/0269 705/14.44 |
| 2014/0184905 A1* | 7/2014 | Mountain | H04N 21/4884 348/384.1 |
| 2014/0207563 A1* | 7/2014 | Liu | G06Q 30/0244 705/14.43 |
| 2014/0280193 A1 | 9/2014 | Cronin et al. | |
| 2014/0304071 A1 | 10/2014 | Manafy et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
ESTES, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages
Nieva, Richard, "Google Home and eBay can tell you how much that's worth", cnet, Mar. 8, 2017 (3 pages).
Novet, et al., "Amazon is getting ready to bring Alexa to wore", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).

(56) References Cited

OTHER PUBLICATIONS

Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).

Perez, "Alexa's 'Routines' will combine smart home control with other actions, like delivering your news and weather", TechCrunch, Sep. 28, 2017, 10 pages.

Perez, Sarah, "The first ad network for Alexa Skills shuts down following Amazon's policy changes", Tech Crunch, Jun. 15, 2017 (6 pages).

Porter, Jon, "Amazon Echo Show release date, price, news and features", Techradar, Jun. 26, 2017 (14 pages).

Pringle, "'I'm sorry to hear that': Why training Siri to be a therapist won't be easy", CBC News, Sep. 24, 2017, 3 pages.

Purcher, Jack, Today Google Home's Virtual Assistant can learn its Owner's voice for Security Reasons like Apple's Patent Pending Idea, Apr. 20, 2017, 4 pages.

Sablich, Justin, "Planning a Trip With the Help of Google Home", New York Times, May 31, 2017 (6 pages).

Seifert, Dan, "Samsung's new virtual assistant will make using your phone easier", The Verge, Mar. 20, 2017 (6 pages).

Sherr, Ian, "IBM built a voice assistant for cybersecurity", cnet, Feb. 13, 2017 (2 pages).

Siegal, Daniel, "IP Attys Load Up Apps' Legal Challenges At 'Silicon Beach'", Law360, Los Angeles, California, Feb. 2, 2017 (4 pages).

Unknown Author, "'Dolphin' attacks fool Amazon, Google voice assistants", BBC News, Sep. 7, 2017, 8 pages.

U.S. Notice of Allowance on U.S. Appl. No. 14/085,153 dated May 24, 2017, 17 pages.

U.S. Office Action on U.S. Appl. No. 14/085,153 dated Dec. 3, 2015, 14 pages.

U.S. Office Action on U.S. Appl. No. 14/085,153 dated Jun. 30, 2016, 17 pages.

U.S. Office Action on U.S. Appl. No. 14/085,153 dated Nov. 17, 2016, 17 pages.

Willens, Max, "For publishers, Amazon Alexa holds promise but not much money (yet)", Digiday, Jul. 6, 2017 (6 pages).

\* cited by examiner

CONTENT SELECTION

CROSS-REFERENCES TO RELATED APPLICATIONS

This application claims the benefit of priority under 35 U.S.C. § 120 as a continuation of U.S. patent application Ser. No. 14/085,153, filed Nov. 20, 2013, which is hereby incorporated by referenced herein in its entirety.

BACKGROUND

In a networked environment such as the Internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

Systems and methods of the present disclosure are directed generally to content selection. More specifically, systems and methods of the present disclosure are directed to determining one or more low impact (e.g., negative) features to facilitate content selection. A feature may be "low impact" if a content impression (e.g., when the content item is provided for display on a web page to a user device) associated with the feature is less likely to result in a click or conversion, as compared to a content impression not associated with the feature. In an illustrative implementation, all restaurant advertisement impressions may result in an overall click through rate of 1%. However, restaurant advertisement impressions on web pages about printers may result in a lower click through rate of 0.1%. Thus, displaying restaurant advertisements on printer web pages may be a low impact feature because this combination results in a click through rate that is less than the click through rate for all restaurant advertisement impressions by a factor of 10.

At least one aspect is directed to a method of selecting content via a computer network. In some implementations, the method includes accessing a data structure storing, in a memory element, a plurality of impression records. Each impression record can include one or more features and an indication of user interest corresponding to a content impression. The method can include identifying a combination feature based on at least two of the features. The combination feature can indicate that the at least two features correspond to a same content impression. The method can include performing a statistical model (e.g., logistic regression model) using the impression records and the combination feature. In some implementations, a processor of a data processing system executes the statistical model. The method can include determining, via the statistical model, a weight for the combination feature. The weight can indicate user interest in content impressions associated with the combination feature. The method can include providing or transmitting an indication to disable the combination feature for selecting content associated with the plurality of impression records. The indication can be provided to a content selector executing on a server. The indication can be provided responsive to the weight being less than a threshold.

In some implementations, the impression records correspond to a type of content provider. In some implementations, the method includes selecting the impression records corresponding to a time interval. In some implementations, the indication of user interest indicates that a user selected a content item of the content impression or the user did not select the content item of the content impression.

In some implementations, the features include at least two of a web page category, a content category, a geographic region, and a language. In some implementations, the combination feature includes a combination of at least two of a web page category, a content category, a geographic region, and a language.

In some implementations, the method includes determining, via the logistic regression, a weight for each of the plurality of features. The method can include identifying a lowest weight based on the weight for each of the plurality of features. The method can also include transmitting an indication to disable a feature corresponding to the lowest weight. In some implementations, the method can include modifying the threshold using content performance feedback. The content performance feedback can include at least one of a click through rate and conversion rate.

In some implementations, the method includes receiving, via the computer network, a request for content corresponding to the combination feature. The method can include identifying that the combination feature is disabled for selecting content associated with the plurality of impression records. The method can also include identifying that the combination feature is enabled for second content associated with a second plurality of impression records. The method can include selecting the second content as a candidate for display on a user device associated with the request.

In some implementations, the method includes determining, via the logistic regression, based on a second plurality of impression records, a second weight for the combination feature. The second weight may be determined based on a set of impression records corresponding a different time interval. The method can include transmitting to the content selector, responsive to the second weight being greater than a second threshold, an indication to enable the combination feature for selecting content associated with the second plurality of impression records.

In some implementations, the method includes determining, via the logistic regression, a second weight for a feature of the plurality of features. The method can also include an transmitting an indication to enable the feature for selecting content associated with the plurality of impression records. The indication can be transmitted to the content selector responsive to the second weight being greater than a second threshold.

At least one aspect is directed to a system for selecting content via a computer network. In some implementations, the system can include a data processing system, at least one processor and a memory element. The data processing system can be configured to access a data structure storing, in the memory element, impression records. Each impression record can include a features and an indication of user interest corresponding to a content impression. The data processing system can be configured to identify a combination feature based on at least two of the plurality of features. The data processing system can be configured to execute a logistic regression using the impression records and the combination feature. The data processing system can be configured to determine, via the logistic regression, a weight for the combination feature. The data processing system can be configured to transmit an indication to disable the combination feature for selecting content associated with the plurality of impression records. The data processing system can transmit the indication via a computer network responsive to the weight being less than a threshold.

At least one aspect is directed to a non-transitory computer-readable storage medium that includes processor executable instructions for selecting content via a computer network. In some implementations, the instruction include instructions to access a data structure storing, in a memory element, impression records. Each impression record can include a features and an indication of user interest corresponding to a content impression. The instructions can include instructions to identify a combination feature based on at least two of the plurality of features. The instructions can include instructions to execute a logistic regression using the impression records and the combination feature. The instructions can include instructions to determine, via the logistic regression, a weight for the combination feature. The instructions can include instructions to transmit an indication to disable the combination feature for selecting content associated with the plurality of impression records. The instructions can include instructions to transmit the indication via a computer network responsive to the weight being less than a threshold.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
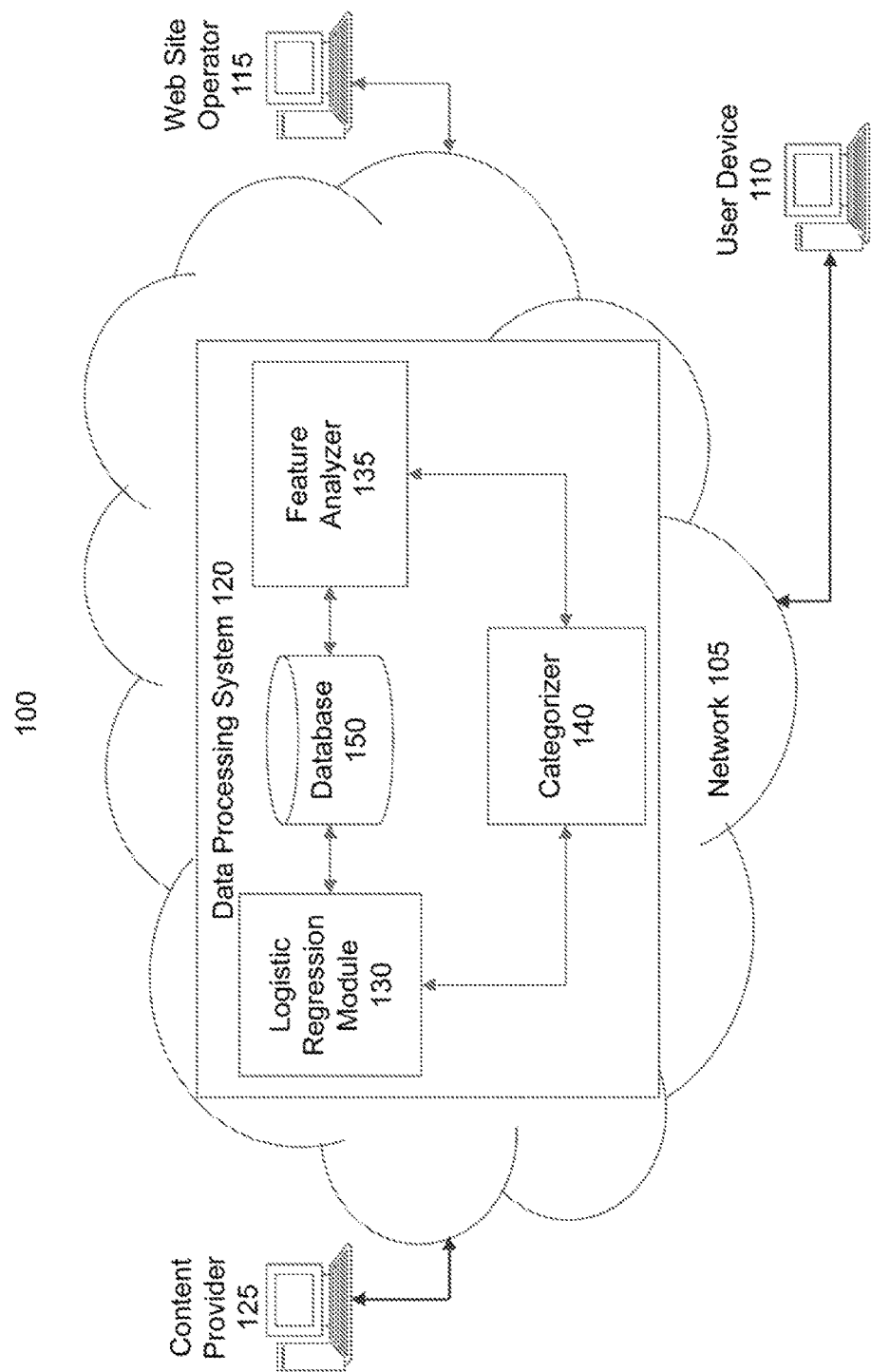
FIG. 1 is an illustration of an example implementation of a system for content selection via a computer network.

Systems and methods of the present disclosure relate generally to facilitating content selection. More specifically, and in some implementations, systems and methods of the present disclosure are directed to determining one or more low impact features associated with a content item to facilitate content selection. A feature may be "low impact" if a content impression associated with the feature is less likely to be of interest to a user of a user device (e.g., less likely to result in a click or conversion), as compared to a content impression not associated with the feature. In an illustrative implementation, a set of restaurant content impressions may result in an overall click through rate of 1%. However, a subset of restaurant content impressions, such as restaurant content impressions on web pages about printers, may result in a lower click through rate of 0.1%. Thus, the subset of restaurant content impressions corresponding to printer web pages may be a low impact feature because this combination results in a click through rate that is less than the click through rate for the set of restaurant content impressions impressions by a factor of 10.

In some implementations, systems and methods of the present disclosure facilitate identifying low impact features using a logistic regression model. The data input to the logistic regression can include logged impression data, where each impression record stored in the log includes several features and a label. The features can include, e.g., a content category (e.g., travel, restaurant, books, cars), a web page category (e.g., news, travel, restaurant, car), country (e.g., United States), and language (e.g., English, French, Spanish). The label can indicate whether the content impression resulted in a user interaction (e.g., a click or no-click). Further, and in some implementations, the input to the logistic regression can include a feature combination, such as advertisement_category X web_page_category X country X language. In other implementations, the logistic regression model can automatically determine relevant feature combinations.

The output of the logistic regression model can include a coefficient value for one or more feature or feature combination. The coefficient may be indicative of the likelihood that a content impression associated with the feature or combination of features will result in a click or conversion. In some implementations, a higher coefficient may be associated with an increased likelihood that a content impression associated with the feature will result in a click or conversion (e.g., a user may be more likely to be interested in the content when the content impression is associated with the feature). In an illustrative implementations, the coefficient for a restaurant content category may be 0.5, a printer web page category may be 0.1, a United States country may be 0.2, and language of English may be 0.3. Further, the coefficient for the combination of these four features may be negative 0.4.

In some implementations, the system can report the coefficient values. In some implementations, the system can use the coefficient values to facilitate content selection. In some implementations, the system compares the coefficient values with a threshold to make a determination regarding content selection. In an illustrative implementation, the system may determine that the combination of restaurant advertisements displayed on printer web pages in the United States in English is a low impact feature because the coefficient −0.4 is less than 0. In some implementations, the system may determine that this feature is a low impact feature because the coefficient is less than a threshold. In some implementations, the system may determine that this feature is low impact because its coefficient is the lowest ranking coefficient or based on some other comparison with the remaining features. Thus, in some implementations, the system may determine not to select restaurant advertisements for display on English language printer web pages when the user device is in the United States. In some implementations, the system may indicate a reduced likelihood of user interest when restaurant advertisements are displayed in combination with the identified features.

In some implementations, the threshold can be automatically optimized using feedback. For example, the system can monitor the performance of a content category based on a threshold and then adjust the threshold accordingly. In some implementations, the data input to the logistic regression model can include a record of all impressions for a given time period, such as the last week, month, 2 months, quarter, etc.

FIG. 1 illustrates one implementation of a system 100 for content selection via a computer network such as network 105. The system 100 and its components, such as a data processing system 120, may include hardware elements, such as one or more processors, logic devices, or circuits. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, mobile computing devices, mobile telecommunication device, wearable computing device, or portable computer. For example, via the network 105 a user of the user device 110 can access web pages provided by at least one web site operator 115. In this example, a web browser of the user device 110 can access a web server of the web site operator 115 to retrieve a web page for display on a monitor of the user device 110. The web site operator 115 generally includes an entity that operates the web page. In one implementation, the web site operator 115 includes at least one web page server that communicates with the network 105 to make the web page available to the user device 110.

Although FIG. 1 shows a network 105 between the user device(s) 110, data processing system 120, content provider 125, and web site operator 115, the user device(s) 110, web site operator 115, content provider 125 and data processing system 125 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the user devices 110 and the data processing system 120, content provider 125, and web site operator 115. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 can include at least one data processing system 120. The data processing system 120 can include at least one logic device such as a computing device having a processor to communicate via the network 105, for example with the user device 110, the web site operator 115, and at least one content provider 125. The data processing system 120 can include at least one server. For example, the data processing system 120 can include a plurality of servers located in at least one data center. In some implementations, the data processing system 120 may include multiple, logically-grouped servers and facilitate distributed computing techniques. In one of these implementations, the logical group of servers may be referred to as a server farm or a machine farm. In another of these implementations, the servers may be geographically dispersed. In other implementations, a machine farm may be administered as a single entity. In still other implementations, the machine farm includes a plurality of machine farms. The servers within each machine farm can be heterogeneous—one or more of the servers or machines can operate according to one type of operating system platform.

In some implementations, servers in the machine farm may be stored in high-density rack systems, along with associated storage systems, and located in an enterprise data center. Consolidating the servers in this way may facilitate system manageability, data security, the physical security of the system, and system performance by locating servers and high performance storage systems on localized high performance networks. Centralizing the servers and storage systems and coupling them with advanced system management tools allows more efficient use of server resources.

Management of the machine farm may be de-centralized. In some implementations, one or more servers may comprise components, subsystems and circuits to support one or more management services for the machine farm. In some of these implementations, one or more servers provide functionality for management of dynamic data, including techniques for handling failover, data replication, and increasing the robustness of the machine farm. Each server may communicate with a persistent store and, in some implementations, with a dynamic store.

Server may include a file server, application server, web server, proxy server, appliance, network appliance, gateway, gateway, gateway server, virtualization server, deployment server, secure sockets layer virtual private network ("SSL VPN") server, or firewall. In some implementations, the server may be referred to as a remote machine or a node.

The data processing system 120, content provider 125, web site operator 115, and user device 110 may be deployed or executed on any type of client or server, or any type and form of computing device, such as a computer, network device or appliance capable of communicating on any type and form of network and performing the operations described herein.

In some implementations, the data processing system 120 includes a content placement system having at least one server. The data processing system 120 can also include at least one logistic regression module 130, at least one feature analyzer 135, and at least one database 150. In some implementations, the data processing system also includes a content selector 140. In some implementations, the data processing system 120 also includes a categorizer 145. The logistic regression module 130, feature analyzer 135, content selector 140, and categorizer 145 can each include at least one processing unit or other logic device such as programmable logic array engine, or module configured to communicate with the database 150. The logistic regression module 130, feature analyzer 135, content selector 140, and categorizer 145 can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. For example, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the data processing system 120 receives content or content items from a content provider 125, such as a commercial entity, online retailer, business, advertiser, individual or any entity that wants to provide content for display on a user device 110 via the computer network 105. The content or content items may include, e.g., text, characters, symbols, images, video, audio, or multimedia content. For example, a content item may include an online advertisement, article, promotion, coupon, or product description.

The data processing system 120 may provide the content item to the web page for display in response to receiving a request for content from a computing device such as, e.g., user device 110. In some implementations, the data processing system 120 receives the request via an application executing on the user device 110. For example, a mobile application executing on a mobile device (e.g., smart phone or tablet) may make a request for content. In another example, a web page may request content from the data processing system 120 responsive to a user of a user device 110 visiting the web page.

In some implementations, the request for content includes information that can facilitate content selection (e.g., keywords, search query, topic information, geographic information, entities, historical data, etc.). In some implementations, the data processing system 120 may request information from the user device 110 to facilitate identifying content or selecting content. The data processing system 120 may request or obtain information responsive to receiving a request for content from the user device 110. The information may include information about displaying the content on the user device 110 (e.g., a content slot size or position) or available resources of user device 110 to display or otherwise manipulate the content. In some implementations, the information may indicate a web page category on which the content item is to be displayed, a geographic region associated with the user device on which the content item is to be displayed, or a language of the web page or content item.

The data processing system 120 can select content items for presentation based on matching attributes between the request and content item or results of an auction. For example, the data processing system 120 can receive bids from content providers and serve the content items associated with the highest bidders (or a combination of bid and the level of matching or other content item score) at the conclusion of the auction. The bids are amounts that the content providers are willing to pay for presentation (or selection) of their content item on web page. For example, a bid can specify an amount that a content provider is willing to pay for each 1000 impressions (e.g., presentations) of the content item, referred to as a CPM bid. Alternatively, the bid can specify an amount that the content provider is willing to pay for a user interaction with (e.g., a click-through of or hovering a pointer over) the advertisement or a "conversion" following user interaction with the advertisement.

Responsive to a request for content from a web page operator 115, the data processing system 120 provides a content item for display with a web page on a user device 110. A user of the user device 110 may view the content item (e.g., an impression) or may click on or select the content item (e.g., a click). In some implementations, the data processing system 120 or other server receiving or responding to the content request logs the impression. In some implementations, the impression is logged in response to receiving the request. In some implementations, the impression is logged responsive to serving the content item. In yet other implementations, the impression is logged response to some or all of the content item being viewable on the web page on the user device (e.g., the impression is logged responsive to 50% or more of the content item being viewable on a portion of the web page being displayed on the user device).

The data processing system 120 can store, log, record, or obtain, for one or more impressions, an impression record. The impression record can include information associated with the request for a content item, the response to the request to the content item, serving the content item, displaying the content item, or an indication of user interest in the content item. In some implementations, the impression record includes, for each impression, features associated with the impression such as a content item category, a web page category, a geographic region associated with the user device, a language associated with the web page or content item, a category associated with a search query, a user device type (e.g., mobile computing device, smartphone, laptop, desktop computer, tablet, operating system, touch enabled, etc.), a time of day of the impression, or other features that can facilitate content selection. In some implementations, the impression record includes an indication of user interest in the content item such as whether or not the user was interested in the content item (e.g., a click or no-click). The user may indicate interest by clicking on the content item, or making a selection, mouse over, finger gesture, shake motion, voice command, tap, or another indication that indicates user interest in the content item.

One or more data structures can store, in a memory element of the data processing system 120 (e.g., database 150) the impression records. The data structure can store the impression records in various ways. In some implementations, a data structure can store some or all impression records associated with a content provider 125, content campaign (e.g., a collection of content groups associated with a single theme or message) of a content provider 125, or a content group (e.g., a group of content items that share similar content selection criteria and lead to a same landing page). In some implementations, the impression records can be categorized by content provider type. Each impression record may be associated with a content provider identifier, content item identifier, or other unique identifier.

In some implementations, the data structure can store impression records for a content item, content provider, or content provider type in a table that includes one or more rows and columns. In an illustrative implementation, impression records can be stored for a content item in a table where each row corresponds to an impression and each column corresponds to information or features associated with that impression. Table 1 is an illustrative implementation of impression records for content items stored in a table form.

TABLE 1

Illustrative implementation of impression records

| Content ID | Content Category | Web Page Category | Country | Language | Label (e.g., click or no click) |
| --- | --- | --- | --- | --- | --- |
| Content_ID_1 | Pizza | Printers | United States | English | No Click |
| Content_ID_2 | Pizza | Travel | United States | English | Click |
| Content_ID_3 | Pizza | News | United States | English | No click |

The features stored in the data structure (e.g., content_ID, content category, web page category, country, language and label) may include at least one number, letter, character, or symbol. In some implementations, the values or entries for a feature may include real numbers, text, strings, characters, keywords, binary numbers, or other indicator of information associated with a field. In some implementations, the values or entries may correspond to a taxonomy or schema associated with the feature. In some implementations, the entries may include unambiguous entities (e.g., person, place or thing) that include unique identifiers corresponding to an entity taxonomy A conversion occurs when a user initiates or completes a transaction related to a content item provided with a web page. What constitutes a conversion may vary from case to case and can be determined in a variety of ways. For example, a conversion may occur when a user clicks on a content item, is then referred or directed to a web page, and initiates a purchase on the web page. A conversion can also be defined by a content provider to be any measurable/observable user action such as, for example, downloading a white paper, navigating to at least a given depth of a website, viewing at least a certain number of web pages, spending at least a predetermined amount of time on a website or web page, registering an account on a website, etc. Other actions that constitute a conversion can also be used.

In some implementations, the data processing system includes a categorizer 140 designed and constructed to identify a category, classification, schema, taxonomy, or other identifying characteristic that can be used as a feature of an impression record. In some implementations, the categorizer 140 can crawl web pages or web sites to identify web page categories based on meta data, keywords, domain name, or other information associated with a web page. The categorizer 140 can store, in a data structure, a category for a web page associated with a web page address or uniform resource locator of the web page. In some implementations, the categorizer can perform semantic analysis based on data associated with a web page to identify a topic or concept of the web page. The categorizer 140 may further parse or otherwise analyze content items to determine a content category, or content provider data to determine a content provider type. In some implementations, the categorizer 140 can parse or otherwise analyze search queries to determine a search query category based on a schema or taxonomy (e.g., travel, flying, entertainment, etc.).

In some implementations, the data processing system 120 includes a statistical module 130 or logistic regression module 130 designed and constructed to use a probabilistic classification model to predict the outcome of a categorical dependent variable (e.g., a binary value such as click or no click; 0 or 1; or interested or not interested) based on one or more predictor variables (e.g., features or combinations of features that can be real-valued, binary, categorical, etc.). In some implementations, a processor of the data processing system 120 executes the logistic regression. The logistic regression module 120 can be configured to obtain impression records from database 150 or any other data structure or data source accessible via network 105 or data processing system 120. Using the impression records, the logistic regression module 130 can model probabilities describing the possible outcomes of a trial as a function of the features. In some implementations, the logistic regression can predict the odds of a user clicking on a content item based on the values of one or more features or feature combinations associated with the same content item impression. A goal of the logistic regression module 130 may be to estimate or identify a relationship between the features and the outcome. In doing so, the logistic regression module 130 can estimate one or more coefficients for features that fit a model.

In some implementations, the logistic regression module 130 can pre-process the input data (e.g., impression records) to determine if there is a sufficient number of records or type of data to execute a logistic regression and identify coefficients and generate a model that converges. If the logistic regression module 130 determines that there aren't a sufficient number of impression records for a content provider 125, content provider type, or content group, the logistic regression module 130 can wait to execute a logistic regression until there are a sufficient number of impression records.

In some implementations, the logistic regression module 130 can select a subset of all impression records to use to identify regression coefficients. The subset of impression records can be, e.g., selected based on content provider type, content provider 125, time interval, content campaign, content group, etc. A content provider type may include broad categories such as retail, travel, entertainment, news, or more granular categories such as pizza restaurants, shoe retailers, watch retailers, etc. In some implementations, content provider type may include company type (e.g., large businesses, small businesses, international corporations) or selected audiences (e.g., individual consumers, businesses, governments, etc.). Time intervals can include impressions in the last day, week, month, quarter, etc.

In some implementations, the logistic regression module 130 can use the following logistic function, which can take on values between zero and one:

$$\pi(x) = \frac{1}{1 + e^{-(\beta_0 + \beta_1 x_1 + \beta_2 x_2 + \ldots \beta_m x_m)}},$$

where the output π(x) is the probability that the dependent variable equals a click (a case or a success) and is confined to values between 0 and 1; and the input $(\beta_o + \ldots \beta_m x_m)$ can be a value from negative infinity to positive infinity and account for multiple features $\beta_m$. In some implementations, $\beta_m$ is a single feature (e.g., web page category), and in some implementations $\beta_m$ can be a combination feature (e.g., web page category X content category X language X country). The logistic regression module 130 can estimate the regression coefficients $\beta_m$ using various techniques including, e.g., a maximum likelihood estimation, an iterative process, to identify a solution at which point the process converges. In some implementations, the logistic regression module 130 can identify a combination of features for which coefficients converge. The model converging may indicate that the coefficients are meaningfully related to one another. In some implementations, the logistic regression module 130 may not include a combination of features if the model does not converge (e.g., a large number of features to cases, multi-collinearity, sparseness, or complete separation).

In some implementations, the logistic regression module 130 can use a combination feature based on two or more features of the impression records. In some implementations, the logistic regression module 130 identifies the combination feature. For example, the logistic regression module 130 can iterate through all feature combinations and estimate coefficients for the combinations that satisfy a model. In some implementations, the data processing system 120 can be configured to use a predetermined combination feature. In an illustrative implementation, a combination feature may include all features of an impression record. In another illustrative implementation, a combination feature may include web page category AND content category AND language AND geographic location (e.g., country). In some implementations, the logistic regression module 130 can identify regression coefficients for the largest combination of features for which the model converges. In some implementations, an administrator of the data processing system 120 can modify the combination feature. In some implementations, the data processing system 120 can identify an optimum combination feature based on feedback. For example, the data processing system 120 may determine that one or more combination features are more useful as low impact criteria because disabling them significantly improves content performance.

Upon fitting the module, the logistic regression module 130 can provide regression coefficients for one or more features or combination of features. The regression coefficients can be specific to a model and indicate the relative effect of a particular feature on the outcome. In some implementations, the logistic regression module 130 determines the regression coefficients using an optimization procedure (e.g., maximum likelihood estimation) that identifies values that best fit the observed data (e.g., impression records) that give the most accurate prediction for the observe data. In some implementations, the optimization procedure may be subject to regularization conditions that seek to exclude unlikely values for regression coefficients (e.g., unlikely values for features such as web page category, language, geographic region, content category, etc.). In some implementations, the logistic regression module stores the regression coefficients (or feature weights) in a database 150. In some implementations, the logistic regression module 130 can report the regression coefficients. In some implementations, the logistic regression module 130 can provide the regression coefficients to a feature analyzer 135.

In some implementations, the data processing system 120 includes a feature analyzer 135 designed and constructed to determine whether a feature, based on its weight, is likely to have a low impact or positive impact on content performance. In some implementations, a negative weight for a feature or combination feature indicates that the presence of that feature or combination feature is indicative of poor content performance (e.g., a low click through rate or conversion rate). Thus, the feature analyze 135 can analyze a weight or regression coefficient of a feature or combination feature and compare it with a threshold. In some implementations, the feature analyzer 135 compares a weight with a threshold to determine whether the weight is less than a threshold. In some implementations, the threshold may be 0, a positive number or a negative number.

In some implementations, the data processing system 120 can adjust the threshold based on performance feedback (e.g., click through rate or conversion rate). In an illustrative implementation, the data processing system 120 may determine that a threshold of 0.5 is too high because disabling all features or combination features below that threshold had a negative impact on content performance (e.g., reduced click through rate or conversion rate). Accordingly, the data processing system 120 may decrease the threshold to 0.2, 0, −0.2, etc. until an optimal threshold is identified. The data processing system 120 may maintain a data structure that includes disabled features and monitor the performance each time a content impression is prevented from being displayed due to the feature being disabled.

In some implementations, the data processing system 120 may compare the coefficients to identify whether to disable a feature. In an illustrative implementation, the data processing system 120 may disable a lowest ranking feature or combination feature. In another implementation, the data processing system 120 may disable a feature or combination feature if the difference between its coefficient and the next closest feature coefficient is greater than a threshold.

The feature analyzer 135 may transmit an indication to disable a combination feature responsive to the combination feature being less than a threshold. In some implementations, the feature analyzer 135 may transmit the indication to a content selector, content serving system, content placement system, or to another system, module, component or server accessible via data processing system 120 or network 105. In some implementations, the data processing system 120 includes a content server. Responsive to receiving a request for content, the data processing system 120 can identify candidate content items based on whether a feature or combination feature is enabled or disabled. In an illustrative implementation, if a combination feature is disabled for a content item, content group or content campaign, the content server may prevent a corresponding content item from being displayed when the feature or combination of features is present. Thus, by preventing the content item from being displayed in situations in which a viewer of the content item will be unlikely to click on the content item, the data processing system 120 can improve content selection.

In some implementations, that data processing system 120 can store, in a data structure corresponding to the content provider type, content provider, content campaign, content group or content item, the indication of enabling or disabling the feature. Thus, upon receiving a request, a content server can determine whether a feature or combination feature associated with the content request is enabled or disabled for a candidate content item. If the feature or combination feature is disabled, the content server can disregard the content item as a candidate for display. Thus, the data processing system 120 may not select a first content item based on the combination feature being disabled for the first content item, while identifying and selecting a second content for which the combination feature is enabled. The data processing system 120 may further select the second content item as a candidate for display.

In some implementations, the regression coefficients can vary over time based on changes in user interests, societal contexts, current events, social perceptions, etc. The data processing system 120 may determine, based on a set of impression records corresponding to a different time interval (e.g., more recent impression records, historical impression records, impression records filtered based on a criteria, etc.) a second weight for a feature or combination feature that is different than an initially determined weight. In some implementations, the second weight may be greater than the threshold, while the first weight was less than the threshold. Thus, the data processing system 120, upon determining that the second weight is greater than the threshold, enable the feature or combination feature. In some implementations, the data processing system 120 may set a higher threshold to enable a combination feature after it was disabled. For example, if the combination feature was previously disabled, the second weight may have to be greater than a second threshold in order for the combination feature to be enabled, where the second threshold is greater than the first threshold.

Figure 2:
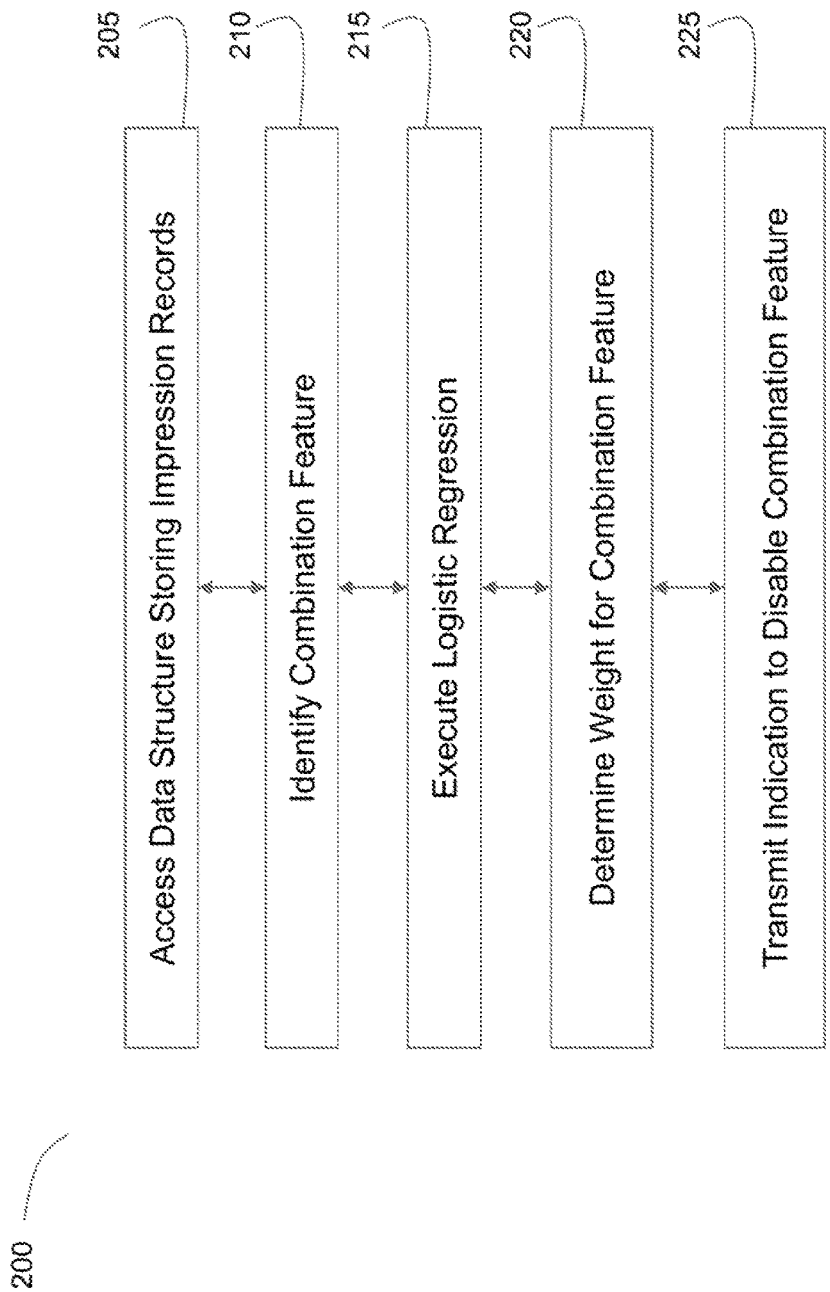
FIG. 2 is an illustration of an example of an implementation of a method of content selection via a computer network.

FIG. 2 is an illustration of one implementation of a method 200 of content selection via a computer network. In brief overview, the method 200 can include accessing a data structure storing, in a memory element, a plurality of impression records (205). Each impression record can include one or more features and an indication of user interest corresponding to a content impression. The method 200 can include identifying a combination feature based on at least two of the features (210). The method 200 can include executing a logistic regression using the impression records and the combination feature (215). In some implementations, a processor of a data processing system executes the logistic regression. The method 200 can include determining, via the logistic regression, a weight for the combination feature (220). The method 200 can include transmitting an indication to disable the combination feature for selecting content associated with the plurality of impression records (225). The indication can be transmitted to a content selector executing on a server. The indication can be transmitted responsive to the weight being less than a threshold.

In further detail, the method 200 includes accessing a data structure storing impression records (205). In some implementations, a data processing system (e.g., a logistic regression module) can access the data structure. In some implementations, the data processing system can select all available impression records or a subset of all impression records. In some implementations, the accessed data structure can include impression records for content items corresponding to a content provider type or content provider. In some implementations, the method includes selecting a subset of impression records based on one or more factors or criteria such as content provider type, content provider, time interval, content category, performance metrics, click through rate, conversion rate, etc. For example, the data processing system may select impression records corresponding to impressions in the last 30 days for content items associated with pizza advertisers or pizza advertisements. In some implementations, an administrator of a data processing system can select a subset of impression records.

In some implementations, the method 200 includes identifying a combination feature based on at least two of the plurality of features (205). In some implementations, the combination feature can include a combination of some or all features associated with the impression record. In some implementations, the features of the impression record may include web page category, content item category, geographic region associated with a user device associated with a content request that resulted in the impression record (e.g., country, state, or region), language (e.g., language of the web page, content item or native language used on the user device), or search query category. The method 200 can include a data processing system selecting the combination features based on a predetermined combination, or based on a logistic regression that identifies a combination of features for which regression coefficient can be estimated.

In some implementations, the method 200 includes executing a logistic regression using the plurality of impression records and the combination feature (210). In some implementations, the logistic regression includes identifying the combination feature. In some implementations, the method includes identifying regression coefficients associated with a feature or combination feature of the logistic regression. In some implementations, the method 200 includes the data processing system determining a weight for the combination feature (215).

The method 200 can include a data processing system comparing the weight of the combination feature with a threshold. Responsive to the weight being less than the threshold, the method 200 can include transmitting an indication to disable the combination feature for selecting content associated with the input impression records. The content associated with the impression records may include content or content items that correspond to the same or similar content category, content provider type, content provider, or content items themselves. Thus, in some implementations, the results of the logistic regression may be applied to future selection of the content items associated with the impression records, or extrapolated influence content selection of other related content items (e.g., same content provider type, content provider, content category, etc.).

Figure 3:
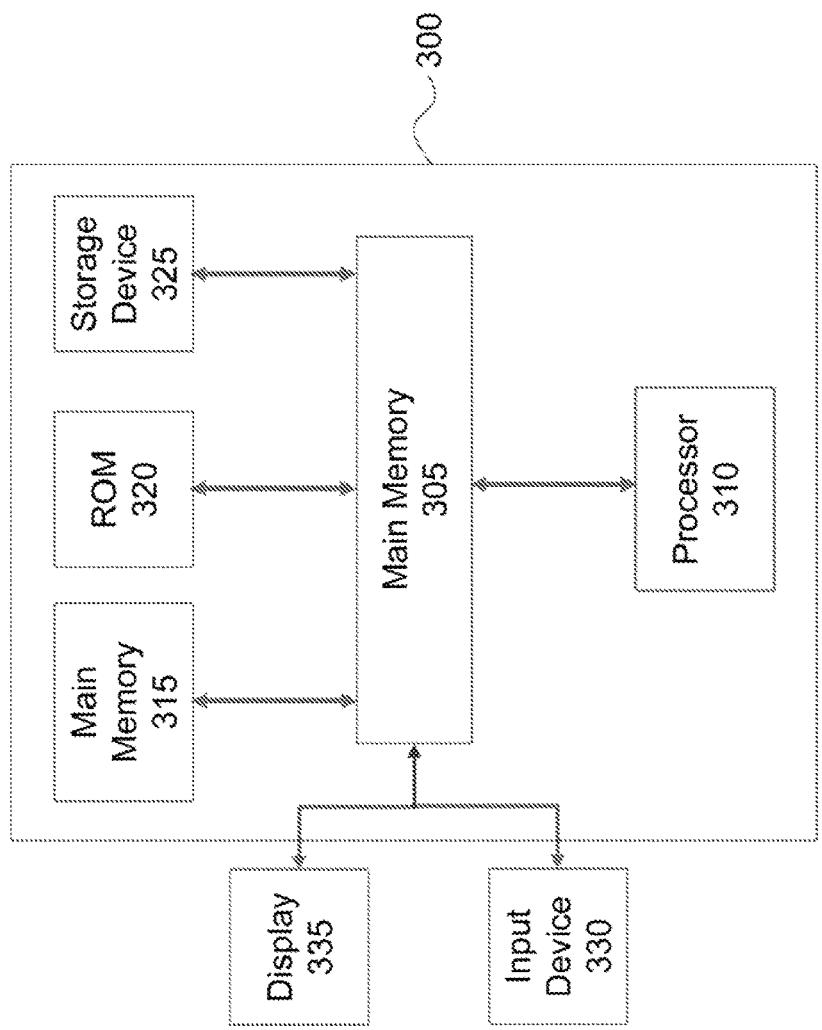
FIG. 3 is a block diagram illustrating a general architecture for a computer system that may be employed to implement various elements of the systems and methods described herein, in accordance with an implementation.

FIG. 3 is a block diagram of a computing system 300 in accordance with an illustrative implementation. The computing system or computing device 300 can be used to implement the system 100, content provider 125, user device 110, web site operator 115, data processing system 120, logistic regression module 130, feature analyzer 135, categorizer 140, and database 150. The computing system 300 includes a bus 305 or other communication component for communicating information and a processor 310 or processing circuit coupled to the bus 305 for processing information. The computing system 300 can also include one or more processors 310 or processing circuits coupled to the bus for processing information. The computing system 300 also includes main memory 315, such as a random access memory (RAM) or other dynamic storage device, coupled to the bus 305 for storing information, and instructions to be executed by the processor 310. Main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid state device, magnetic disk or optical disk, is coupled to the bus 305 for persistently storing information and instructions.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information and command selections to the processor 310. In another implementation, the input device 330 has a touch screen display 335. The input device 330 can include a cursor control, such as a mouse, a trackball, or cursor direction keys, for communicating direction information and command selections to the processor 310 and for controlling cursor movement on the display 335.

According to various implementations, the processes described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. In alternative implementations, hard-wired circuitry may be used in place of or in combination with software instructions to effect illustrative implementations. Thus, implementations are not limited to any specific combination of hardware circuitry and software.

Although an example computing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by one or more data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for feature combination-based content selection via a computer network, comprising:
   a data processing system comprising memory and one or more processors to:
   access a data structure storing, in the memory, a plurality of records corresponding to a plurality of content presentations of one or more content items of a content group, each of the plurality records including a plurality of features and an indication of interest in the content group, the plurality of features including at least two of a web page category, a content category, a geographic region, a language, and a device type;
   identify, from a record of the plurality of records, a combination feature that includes a combination of at least two of the web page category, the content category, the geographic region, the language, and the device type;
   identify a statistical model using the plurality of records and the combination feature;
   determine, via the statistical model, a weight for the combination feature, the weight indicating interest in content presentations associated with the combination feature; and
   prevent, via the computer network responsive to the weight being less than a threshold, by a content selector that executes on one or more servers, selection of the one or more content items from the content group for presentation in presence of the combination feature that includes at least two features of the plurality of features.

2. The system of claim 1, wherein the content item includes audio.

3. The system of claim 1, comprising:
   the data processing system to receive the indication of interest in the content group based on feedback received from a computing device comprising a digital assistant.

4. The system of claim 1, comprising:
   the data processing system to determine the indication of interest in the content group based on input received by a computing device, the input comprising at least one of acoustic input, speech input, or tactile input.

5. The system of claim 1, comprising:
   the data processing system to determine the indication of interest in the content group based on a voice command.

6. The system of claim 1, comprising the data processing system to:
   determine the indication of interest in a first content item of the content group based on input received by a computing device; and
   prevent, via the computer network responsive to the weight being less than a threshold, selection of a second content item including audio from the content group for presentation in the presence of the combination feature.

7. The system of claim 1, comprising:
   the data processing system to determine the indication of interest in the content group based on network activity associated with at least one of the one or more content items of the content group.

8. The system of claim 1, comprising:
   the data processing system to determine the indication of interest in the content group based on input received by a computing device.

9. The system of claim 1, comprising the data processing system to:
   determine, via the statistical model comprising a logistic regression model, a weight for each of the plurality of features;
   identify a lowest weight based on the weight for each of the plurality of features; and
   transmit an indication to disable a feature corresponding to the lowest weight.

10. The system of claim 1, comprising the data processing system to:
   receive, via the computer network, a request for content corresponding to the combination feature;
   identify that the combination feature is disabled to prevent selection of the one or more content items of the content group associated with the plurality of records;

identify that the combination feature is enabled for a second content group comprising one or more second content items associated with a second plurality of impression records; and select at least one of the one or more second content items as a candidate for presentation on a computing device associated with the request.

11. A method of feature combination-based content selection via a computer network, comprising:

accessing, by a data processing system comprising memory and one or more processors, a data structure storing, in the memory, a plurality of records corresponding to a plurality of content presentations of one or more content items of a content group, each of the plurality records including a plurality of features and an indication of interest in the content group, the plurality of features including at least two of a web page category, a content category, a geographic region, a language, and a device type;

identifying, by the data processing system, from a record of the plurality of records, a combination feature that includes a combination of at least two of the web page category, the content category, the geographic region, the language, and the device type;

identifying, by the data processing system, a statistical model using the plurality of records and the combination feature;

determining, by the data processing system, via the statistical model, a weight for the combination feature, the weight indicating interest in content presentations associated with the combination feature; and preventing, by the data processing system, via the computer network responsive to the weight being less than a threshold, a content selector executing on one or more servers from selecting the one or more content items from the content group for presentation in presence of the combination feature that includes at least two features of the plurality of features.

12. The method of claim 11, wherein the content item includes audio.

13. The method of claim 11, comprising:
determining the indication of interest in the content group based on network activity associated with at least one of the one or more content items of the content group.

14. The method of claim 11, comprising:
determining the indication of interest in the content group based on input received by a computing device.

15. The method of claim 11, comprising:
receiving the indication of interest in the content group based on feedback received from a computing device comprising a digital assistant.

16. The method of claim 11, comprising:
determining the indication of interest in the content group based on input received by a computing device, the input comprising at least one of acoustic input, speech input, or tactile input.

17. The method of claim 11, comprising:
determining the indication of interest in the content group based on a voice command.

18. The method of claim 11, comprising:
determining the indication of interest in a first content item of the content group based on input received by a computing device; and preventing, via the computer network responsive to the weight being less than a threshold, the content selector executing on one or more servers from selecting a second content item including audio from the content group for presentation in the presence of the combination feature.

19. The method of claim 11, comprising:
determining, via the statistical model comprising a logistic regression model, a weight for each of the plurality of features;

identifying a lowest weight based on the weight for each of the plurality of features; and transmitting an indication to disable a feature corresponding to the lowest weight.

20. The method of claim 11, comprising the data processing system to:

receiving, via the computer network, a request for content corresponding to the combination feature;

identifying that the combination feature is disabled for selecting the one or more content items of the content group associated with the plurality of records;

identifying that the combination feature is enabled for a second content group comprising one or more second content items associated with a second plurality of impression records; and selecting at least one of the one or more second content items as a candidate for presentation on a computing device associated with the request.

* * * * *